United States Patent
Shuster

(10) Patent No.: US 7,996,491 B2
(45) Date of Patent: Aug. 9, 2011

(54) PERSONAL CRITERIA VERIFICATION USING FRACTIONAL INFORMATION

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 145 days.

(21) Appl. No.: 12/471,240

(22) Filed: May 22, 2009

(65) Prior Publication Data

US 2009/0249449 A1    Oct. 1, 2009

Related U.S. Application Data

(63) Continuation of application No. 11/029,298, filed on Jan. 4, 2005, now Pat. No. 7,539,736, which is a continuation of application No. 09/850,838, filed on May 8, 2001, now Pat. No. 6,862,610.

(60) Provisional application No. 60/202,753, filed on May 8, 2000.

(51) Int. Cl.
*G06F 15/16* (2006.01)
*G06F 7/00* (2006.01)

(52) U.S. Cl. ......... 709/217; 709/219; 707/705; 707/758

(58) Field of Classification Search .................. 709/217, 709/219; 707/705, 758
See application file for complete search history.

(56) References Cited

U.S. PATENT DOCUMENTS

| | | | |
|---|---|---|---|
| 5,311,594 A | 5/1994 | Penzias | |
| 5,560,005 A * | 9/1996 | Hoover et al. | 1/1 |
| 5,912,949 A | 6/1999 | Chan et al. | |
| 6,018,724 A | 1/2000 | Arent | |
| 6,073,130 A | 6/2000 | Jacobson et al. | |
| 6,112,181 A * | 8/2000 | Shear et al. | 705/10 |
| 6,282,658 B2 | 8/2001 | French et al. | |
| 6,366,903 B1 | 4/2002 | Agrawal et al. | |
| 6,366,910 B1 | 4/2002 | Rajaraman et al. | |
| 6,374,259 B1 | 4/2002 | Celik | |
| 6,606,744 B1 * | 8/2003 | Mikurak | 717/174 |
| 6,704,787 B1 | 3/2004 | Umbreit | |
| 6,711,681 B1 | 3/2004 | Al-Salqan et al. | |
| 6,839,680 B1 * | 1/2005 | Liu et al. | 705/10 |
| 6,862,610 B2 | 3/2005 | Shuster | |
| 7,010,572 B1 * | 3/2006 | Benjamin et al. | 709/206 |
| 7,539,736 B2 | 5/2009 | Shuster | |
| 2002/0095482 A1 | 7/2002 | Shuster | |
| 2005/0120249 A1 | 6/2005 | Shuster | |
| 2009/0254971 A1 * | 10/2009 | Herz et al. | 726/1 |

* cited by examiner

*Primary Examiner* — Ranodhi N Serrao
(74) *Attorney, Agent, or Firm* — Knobbe Martens Olson & Bear, LLP

(57) ABSTRACT

A method for verifying the identity of users connected to a computer network comprises providing fractional information queries to users, wherein responses to these individual queries are not sufficient to identify the user. This method further comprises receiving responses to these fractional information queries and comparing these responses to data available from within a computer network. A set of potential matches to the user is generated according to these responses and is used in determining whether the set of potential matches is sufficient to identify the user.

20 Claims, 2 Drawing Sheets

PERSONAL CRITERIA VERIFICATION USING FRACTIONAL INFORMATION

CROSS REFERENCE TO RELATED APPLICATIONS

This application is a continuation of application Ser. No. 11/029,298, filed Jan. 4, 2005, now U.S. Pat. No. 7,539,736, which is a continuation of application Ser. No. 09/850,838, filed May 8, 2001, now U.S. Pat. No. 6,862,610, which claims priority pursuant to 35 U.S.C. §119(e) to U.S. Provisional Application No. 60/202,753, filed May 8, 2000, which applications are specifically incorporated herein, in their entirety, by reference.

BACKGROUND OF THE INVENTION

1. Field of the Invention

The present invention relates to the verification of an individual's identity in a wide area network. More specifically, this invention relates to a method and apparatus for verifying identity using fractional information taken from the user.

2. Description of Related Art

For many years, the global retail market has been characterized as a market in which products are sold from physical locations. In recent years, however, this dynamic has undergone a significant change in response to the increasing popularity of the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols. Using the Internet, businesses can now more readily sell their products to a vast number of customers beyond local boundaries. Business transacted primarily over computer networks such as the Internet is commonly known as electronic commerce and will herein be referred to as such.

Systems for wide-area networks, such as the Internet, are presently limited, however, in the amount of security they offer to consumers and businesses against fraud. In particular, in electronic commerce it is commonplace to approve electronic transactions without ever seeing the purchaser or viewing any identifying material (such as a drivers license). In addition to financial fraud, the Internet has also experienced a growing problem with regards to age representation fraud, whereby underage individuals are able to gain unauthorized access to many websites on the Internet by claiming to be older than they actually are. To prevent such unauthorized access (and in general, to prevent other forms of fraud and theft), it is desirable to confirm the identity and/or age of the user requesting access to restricted material by checking an identifying code supplied by an unknown user against publicly available identity databases. For example, if a social security number is supplied, this information can then be used to verify other information about the user, such as the user's age, gender, credit history, state of residence, etc. For further example, many Internet age-verifying services operate chiefly by obtaining a user's credit card number over the Internet.

While it is certainly possible in an electronic commerce transaction to request identifying information about an individual, such as a full social security number, credit card number, or a telephone number, individuals are in many situations reluctant to give such information for fear of compromising their privacy or risking loss of control over their confidential identifying and account information. Individuals may be particularly reluctant to share identifying information when the reputation of the requesting entity is not known to the user, and its trustworthiness is therefore in question. Currently, no system exists that enables users to verify certain facts about themselves, such as their age, without forfeiting their privacy and supplying confidential identity numbers to a potentially untrustworthy requestor. If these disadvantages could be overcome, it is anticipated that more electronic commerce transactions would occur than presently take place. It would thus be advantageous to implement an electronic business method and system which enables businesses to verify the identity of such clients at a minimal risk to the clients' privacy and without needing to posses confidential identity numbers belonging to the clients.

SUMMARY OF THE INVENTION

In an embodiment of the invention, a method and apparatus for verifying the identity of users connected to a computer network comprises providing fractional information queries to users, wherein responses to individual ones of these queries are not sufficient to identify the user. In combination, however, the responses to the queries have a very high probability of uniquely identifying the user. This method further comprises receiving responses to these fractional information queries and comparing these responses to data available from a secure, preferably independent source within a computer network. A set of potential matches to the user is generated according to these responses by the secure source. If more than one match is discovered, additional information may be supplied by the user until the users identity is confirmed. At the same time, the potentially untrustworthy site need not ever posses any identifying information while still being assured that the user is who she claims to be.

A more complete understanding of a method and apparatus for identifying the identity of individuals will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards a method and apparatus for verifying the identity of individuals in a wide area network. More specifically, this invention is directed towards verifying an individual's identity using fractional information taken from the user.

Figure 1:
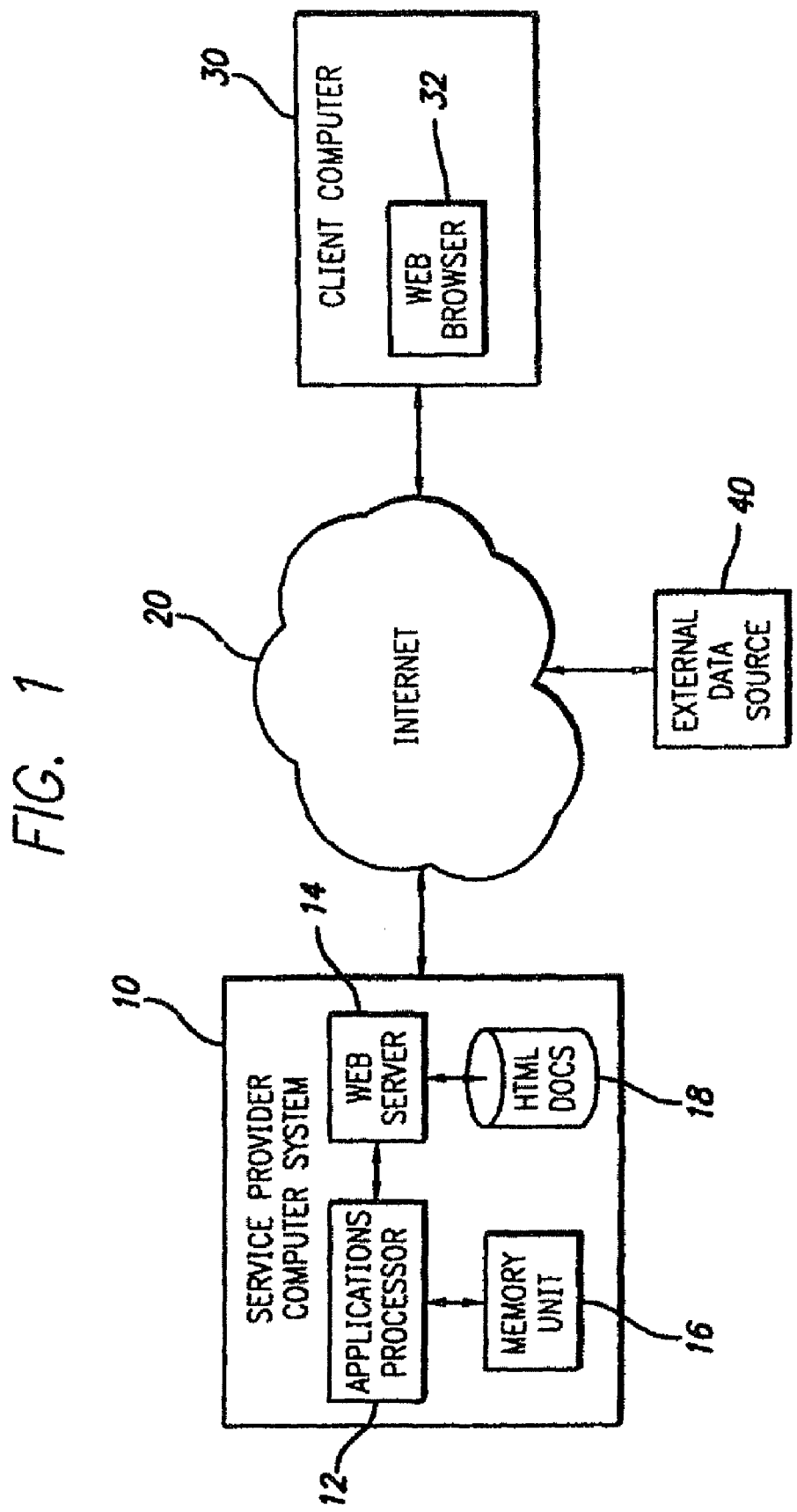
FIG. 1 is block diagram demonstrating a preferred embodiment of the invention.

Referring first to FIG. 1, a block diagram is illustrated of a wide area network employing a method and apparatus according to an embodiment of the invention. Although the invention is especially suitable for implementation on a system as will be described, the method may also be effectively implemented on other systems. It is anticipated that the present invention operates with a plurality of computers that are coupled together on a wide area network, such as the Internet 20, or other communications network. FIG. 1 depicts such a network that includes a service provider computer system 10, a client computer 30, and an external data source 40. The service provider computer system 10 is further comprised of an applications processor 12 coupled to a memory unit 16 and a Web server 14 connected to an HTML (Hyper-Text Markup Language) documents database 18.

It should be appreciated that Web server 14 accesses a plurality of Web pages, distributable applications, and other electronic files containing information of various types stored in the HTML documents database 18. As a result, Web pages may be viewed on various web-enabled computers in a given network, such as a client computer 30. For example, a particular Web page or other electronic file may be viewed through a suitable application program residing on the client computer 30 such as a browser 32, or by a distributable application provided to the client computer 30, by the Web server 33. It should be appreciated that many different information retrieval devices, many different Web servers, and many different search servers of various types may be communicating with each other at the same time.

As is generally known in the art, a client identifies a Web page it wishes to retrieve by communicating an HTTP (Hyper-Text Transport Protocol) request from the browser application 32. The HTTP request includes the Uniform Resource Locator (URL) of the desired Web page, which may correspond to an HTML document stored in the HTML documents database 18. The HTTP request is then routed to the Web server 14 via the Internet 20. The Web server 14 then retrieves the HTML document identified by the URL, and communicates the HTML document across the Internet 20 to the browser application 32. The HTML document may be communicated in the form of plural message packets as defined by standard protocols, such as the Transport Control Protocol/Internet Protocol (TCP/IP).

The external data source 40 is preferably a secure database run by an independent service provider. Service providers and other entities that desire to practice the method to identify individuals may subscribe to the database in advance of performing the search. They may be assigned an encryption key by the database service to ensure the security of messages exchanged with the external data provider. This is particularly desirable where the identity information to be transmitted back from the database is especially sensitive or confidential, for example, where it comprises an individual's credit history. For other applications, such as age verification, the information transmitted back may comprise a bare confirmation that the individual has (or has not, as the case may be) attained the required age. Such information is unlikely to require encryption.

Figure 2:
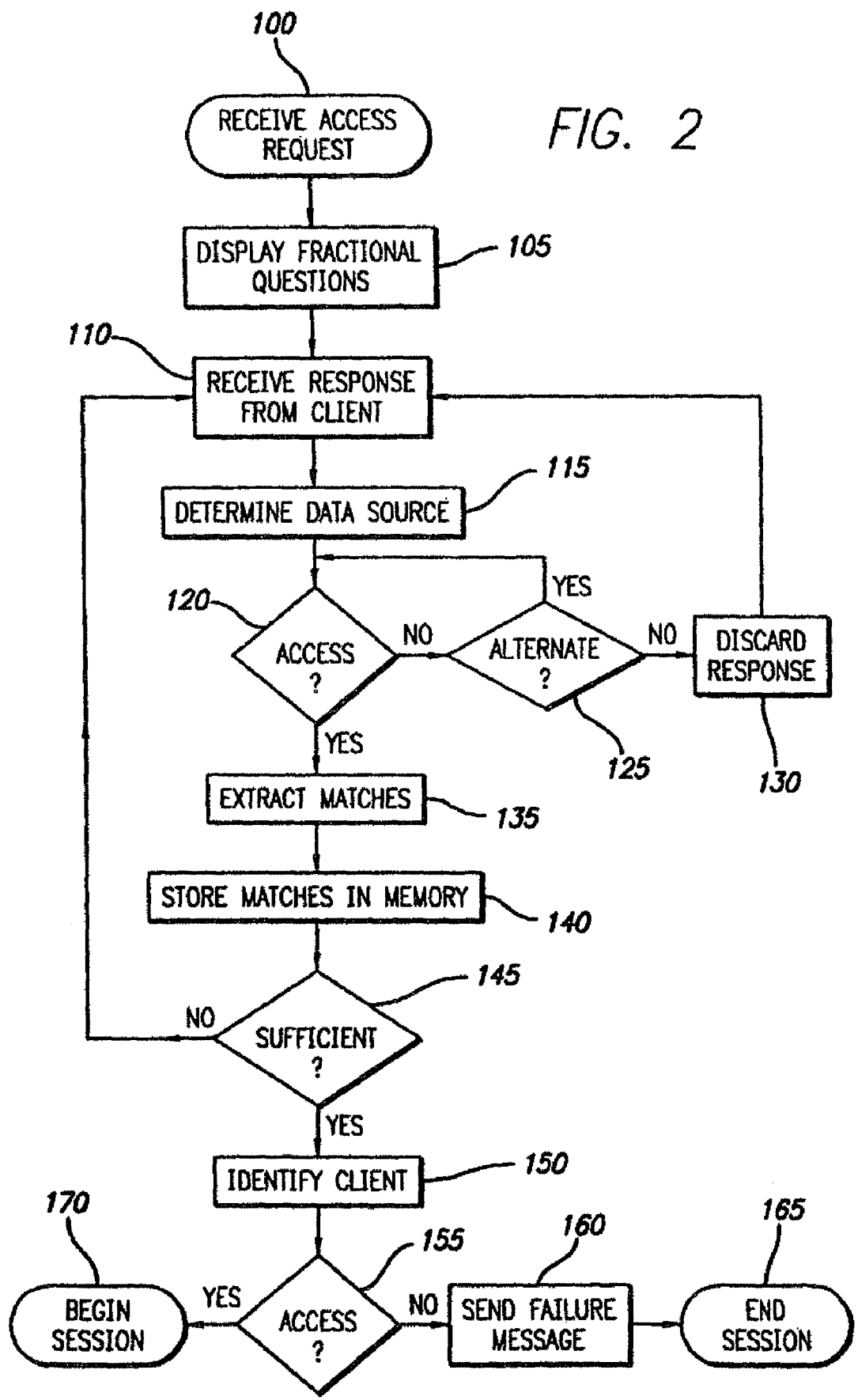
FIG. 2 is a flow chart illustrating the steps for identifying a client according to an embodiment of the invention.

In FIG. 2, a flow chart illustrating the steps for identifying a client according to an embodiment of the invention is shown. The identifying procedure begins at step 100 when the service provider computer system 10 receives a website access request from a client computer 30. At step 105, the service provider computer system 10 responds to this request by prompting the client to answer several "fractional questions". It should be appreciated that a "fractional question" is defined hereinafter as a question where only partial information is asked (e.g., the first three digits of a phone number, the last four digits of a social security number, etc.). For example, the client may be asked to supply his age, last four digits of his social security number, last four digits of his telephone number, and first three numbers of his street address (inserting spaces or zeros if the street address has less than three digits). Such information will preferably not contain data of a nature that will enable ready identification of the individual except by using an extensive database of social security numbers, telephone numbers, addresses, and etc., all linked to the desired identity data. For example, it would generally not be desirable to include the entire zip code or street address in such information, because doing so could make the task of identifying the user too easy or even trivial.

The procedure continues at step 110 with the service provider computer system 10 receiving a response to individual fractional questions from the client. Beginning with the first received response at step 110, the service provider computer system 10 determines which external data source 40 it will use to confirm those particular responses. Access to the external data source 40 chosen at step 115 is then requested at step 120. If access is granted to the external data source 40 at step 120, then the procedure continues with the extraction of all matches to the fractional information provided by the client which are included in that particular data source 40. If for some reason the primary database is not available or has no data matching the fractional information, the service provider computer system 10 may attempt to use an alternate data source 40 at optional step 125. If an alternate data source 40 is found at step 125, then access to this data source is requested at step 120, otherwise, this particular client response is discarded at step 130, followed by a return to step 110 where the procedure is repeated for the next client response. In an alternative embodiment, certain of the fractional information are withheld from each database provider, making it impossible for any single database provider to possess the identity of the requestor. Instead, the database responses may be combined and analyzed by an independent, trusted source, thereby adding another layer of privacy and security.

Once the extraction of all fractional information matches is made at step 135, the procedure continues at step 140 with these matches being stored in the memory unit 16 of the service provider computer system 10. At step 145, the service provider computer system 10 then determines whether the matches stored in its memory unit 16 are sufficient to identify the client. In an exemplary embodiment, a service provider computer system 10 may contain "n" number of matches in its memory unit 16 at step 140. If this particular service provider were only concerned with its clients being over a certain age, the sufficiency criterion at step 145 may be fulfilled if all "n" individuals satisfy the service provider's age requirements. In another example, a service provider may be more concerned with financial fraud, in which case a sufficiency criterion that identifies a specific individual would be more appropriate.

If the number of matches stored in the memory unit 16 satisfy the aforementioned sufficiency criterion, then the client is identified at step 150; otherwise, the service provider computer system 10 returns to step 110 where the procedure is repeated with respect to additional responses received from the client. For example, more detailed information in the same classes may be requested (for example, an additional digit of an identity number or additional letter of a name), or information from an entirely new class. It should be appreciated that if and when the above procedure requires an additional iteration at step 145 (i.e., the set of matches stored in the memory unit 16 do not satisfy the sufficiency criterion), the extracted set of matches in one iteration are used to begin the following iteration resulting in a set of matches that is smaller or equal in size to the set of matches found in the previous iteration.

Once a client is identified at step 150, the procedure continues at step 155 where the service provider computer system 10 determines whether to grant access to this particular client. It should be appreciated that this determination may vary according to the policies of each service provider. With respect to age, for example, one service provider may grant access to a client of a particular age while another service provider may not. If access is granted to the client at step 155, then the online session pertaining to that particular service provider begins at step 170; otherwise, a failure message is sent to the client at step 160 and the session is terminated at step 165. The service provider never possesses the specific identity of the client unless authorized by the client to receive such information.

Generally, it should be appreciated that the amount of fractional information provided by the user is an important aspect of the invention. For example, if eight out of nine digits of a social security number must be supplied, the privacy and confidentiality of the user may not be adequately protected. On the other hand, if too little unique information is supplied, for example, only one digit of the number, then the task of identifying the user may either not be possible, or may take too long. It is desirable, therefore, in the design of the specific identifying query to balance the speed with which an individual may be identified against the need to protect privacy and confidentiality. An appropriate query may be selected by one skilled in the database and statistical arts. It is further desirable that the query be impracticable to complete except using the most advanced databases that are available, so that the entities capable of performing the identity checking will be relatively few, and therefore, relatively more secure. It is anticipated that the database provider will be motivated to formulate a query structure that is perceived as very secure by the vast majority of users, in order to attract as much identity-checking business as possible.

Having thus described a preferred embodiment of a method and apparatus for identifying the identity of individuals, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method comprising:
    in response to a request for access to data that is accessible only to individuals meeting at least one predetermined criterion, requesting only partial identifying information for a person requesting access to the data, wherein the partial identifying information includes less than all characters of a data element that is usable to identify the person;
    requesting, using a computer, information regarding records associated with respective individuals having attributes matching the partial identifying information;
    receiving, by the computer, information regarding a plurality of records associated with respective individuals each having attributes matching the partial identifying information;
    determining whether each of the plurality of records includes attributes matching the at least one predetermined criterion; and
    in response to determining that each of the plurality of records includes attributes matching the at least one predetermined criterion, providing an indication that the person requesting access is authorized to access the data without providing a specific identity of the person.

2. The method of claim 1, wherein, in response to determining that not all of the plurality of records include attributes matching the at least one predetermined criterion, denying access to the data by the person.

3. The method of claim 1, wherein, in response to determining that not all of the plurality of records include attributes matching the at least one predetermined criterion, requesting additional partial identifying information distinct from the partial identifying information for the person requesting access.

4. The method of claim 3, further comprising:
    requesting, using the computer, information regarding a second plurality of records associated with respective individuals each having attributes matching the partial identifying information and the additional partial identifying information; and
    in response to determining that each of the second plurality of records includes attributes matching the at least one predetermined criterion, providing an indication that the person requesting access is authorized to access the data without providing a specific identity of the person.

5. The method of claim 1, wherein the at least one predetermined criterion defines a current age of a person.

6. The method of claim 1, wherein the at least one predetermined criterion defines a current residence location of a person.

7. The method of claim 1, further comprising receiving the request for access at a user computer, wherein the requested data is stored in a data storage device operably associated with the user computer.

8. The method of claim 1, wherein said requesting comprises querying at least two independent data sources.

9. The method of claim 8, further comprising withholding part of the partial identifying information from at least one of the at least two independent data source.

10. An apparatus comprising:
    a computer operably associated with a memory, the memory holding instructions configured to cause the computer to:
    request partial identifying data of a person requesting access to information that is accessible only to persons meeting at least one predetermined criterion wherein the partial identifying data includes less than all characters of a data element that is usable to identify the person;
    query at least one data source using the partial identifying data to identify one or more records associated with respective individuals each having attributes matching the partial identifying data;
    determining whether each of the identified one or more records includes attributes matching the at least one predetermined criterion; and
    in response to determining that each of the identified one or more records includes attributes matching the at least one predetermined criterion, providing an indication that the person requesting access is authorized to access the information without providing a specific identity of the person.

11. The apparatus of claim 10, wherein the memory holds further instructions configured to cause the computer to provide access to the information only if each of the identified one or more records includes attributes matching the at least one predetermined criterion.

12. The apparatus of claim 10, wherein the memory holds further instructions configured to cause the computer to request additional partial identifying data if one or more of the identified one or more records does not include attributes matching the at least one predetermined criterion, the additional partial identifying data distinct from the partial identifying data for the person.

13. The apparatus of claim 12, wherein the memory holds further instructions configured to cause the computer to query the at least one data source a second time using the partial identifying data and the additional partial identifying data to obtain a second one or more records each having attributes matching the partial identifying data and the additional partial identifying data; and provide access to the information only if each of the second one or more records includes attributes matching the at least one predetermined criterion.

14. The apparatus of claim 10, wherein one of the predetermined criterion comprises a minimum age.

15. The apparatus of claim 10, wherein one of the predetermined criterion comprises a current residence location.

16. The apparatus of claim 10, wherein the memory holds further instructions configured to cause the computer to receive a request for access at a user computer, wherein the information is stored in a data storage device operably associated with the user computer.

17. The apparatus of claim 10, wherein said querying comprises querying at least two independent data sources.

18. The apparatus of claim 17, wherein the memory holds further instructions configured to cause the computer to withhold part of the partial identifying data from at least one of the at least two independent data sources.

19. A non-transitory tangible computer readable storage medium having software instructions stored thereon that, in response to execution by a computing device, cause the computing device to perform operations comprising:

in response to a request for access to data that is accessible only to individuals meeting at least one predetermined criterion, requesting only partial identifying information for a person requesting access to the data, wherein the partial identifying information includes less than all characters of a data element that is usable to identify the person;

requesting information regarding records associated with respective individuals having attributes matching the partial identifying information;

receiving information regarding a plurality of records associated with respective individuals each having attributes matching the partial identifying information;

determining whether each of the plurality of records includes attributes matching the at least one predetermined criterion; and in response to determining that each of the plurality of records includes attributes matching the at least one predetermined criterion, providing an indication that the person requesting access is authorized to access the data without providing a specific identity of the person.

20. The non-transitory tangible computer readable storage medium of claim 19, wherein said requesting comprises querying at least two independent data sources.

* * * * *